United States Patent
Sandstrom et al.

(10) Patent No.: US 7,928,157 B2
(45) Date of Patent: Apr. 19, 2011

(54) TIRE WITH TREAD HAVING ENHANCED WET TRACTION

(75) Inventors: Paul Harry Sandstrom, Cuyahoga Falls, OH (US); Joseph Kevin Hubbell, Akron, OH (US); Thomas Charles Lippello, III, Fairlawn, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 509 days.

(21) Appl. No.: 11/852,375

(22) Filed: Sep. 10, 2007

(65) Prior Publication Data

US 2009/0069474 A1    Mar. 12, 2009

(51) Int. Cl.
*B60C 1/00* (2006.01)
*C08L 23/00* (2006.01)
*C07F 7/12* (2006.01)
*C07F 7/00* (2006.01)

(52) U.S. Cl. ........ 524/495; 524/492; 524/274; 524/174; 524/176; 524/571

(58) Field of Classification Search .................. 524/495, 524/492, 274, 174, 176, 571; 260/100, 103, 260/104, 105
See application file for complete search history.

(56) References Cited

U.S. PATENT DOCUMENTS

| 3,912,709 | A | 10/1975 | Gould | 260/100 |
| 4,127,546 | A | 11/1978 | Lundberg et al. | 260/27 BB |
| 5,994,434 | A * | 11/1999 | Uchino et al. | 524/174 |
| 7,231,951 | B2 | 6/2007 | Sandstrom et al. | 152/543 |
| 2002/0077408 | A1 | 6/2002 | Rauline | 524/495 |
| 2003/0111770 | A1 | 6/2003 | Bohm et al. | 264/349 |

FOREIGN PATENT DOCUMENTS

| EP | 1 184 414 | 3/2002 |
| EP | 1 767 570 | 3/2007 |
| KR | 10-2005-0122033 | 12/2005 |
| KR | 10-0650011 | 11/2006 |
| KR | 10-0655222 | 12/2006 |

OTHER PUBLICATIONS

European Search Report completed Dec. 18, 2008.

* cited by examiner

*Primary Examiner* — William K Cheung
(74) *Attorney, Agent, or Firm* — Henry C. Young, Jr.

(57) ABSTRACT

This invention relates to a tire with a tread of a rubber composition which contains zinc rosinate within and on the surface of said rubber composition. Said zinc rosinate promotes enhanced wet traction for said tire tread by actually replacing a more conventional zinc stearate for a tire tread rubber composition. Said zinc rosinate is a product of a combination of rosin acid and zinc oxide formed in situ within said rubber composition. Said more conventional zinc stearate is a product of a combination of stearic acid and zinc oxide formed in situ within a tread rubber composition.

9 Claims, No Drawings

TIRE WITH TREAD HAVING ENHANCED WET TRACTION

FIELD OF THE INVENTION

This invention relates to a tire with a tread of a rubber composition which contains zinc rosinate within and on the surface of said rubber composition. Said zinc rosinate promotes enhanced wet traction for said tire tread by actually replacing a more conventional zinc stearate for a tire tread rubber composition. Said zinc rosinate is a product of a combination of rosin acid and zinc oxide formed in situ within said rubber composition. Said more conventional zinc stearate is a product of a combination of stearic acid and zinc oxide formed in situ within a tread rubber composition.

BACKGROUND OF THE INVENTION

It is important for tires, particularly high performance tires and race tires, to have good traction for the running surface of the tire. It is also important for tires to have good wet traction on wet road surfaces.

In practice, rubber compositions for tire treads typically contain a combination of zinc oxide and stearic acid which forms zinc stearate in situ within the rubber composition. Zinc stearate itself is a relatively slippery soap in the presence of water which gradually migrates and blooms to the running surface of the tire to thereby reduce the tire tread's wet traction on wet road surfaces.

Accordingly, a challenge has been undertaken to evaluate the feasibility of providing an alternative to the zinc stearate soap contained in the tire tread for the running surface of the tire tread particularly where enhanced wet traction for the tread running surface is desired.

For such challenge, the feasibility of replacing at least a major portion (greater than 50 percent), or all, of the stearic acid in the tread rubber composition with rosin acid is evaluated with a resultant formation of zinc rosinate in situ within the tread rubber composition instead of the zinc stearate.

While it is contemplated that the zinc rosinate is also a soap, it is in the nature of a sticky soap in the presence of water as compared to the aforesaid slippery zinc stearate soap, particularly when the tread surface is wet in the sense of traveling over a wet substrate.

In the description of this invention, the terms "compounded" rubber compositions and "compounds"; where used refer to the respective rubber compositions which have been compounded with appropriate compounding ingredients. The terms "rubber" and "elastomer" may be used interchangeably unless otherwise indicated. The amounts of materials are usually expressed in parts of material per 100 parts of rubber by weight (phr).

DISCLOSURE AND PRACTICE OF THE INVENTION

In accordance with this invention, a tire having a tread composed of a rubber composition which contains in situ formed zinc rosinate within said rubber composition and on the running surface of said tread comprised of, based upon parts by weight per 100 parts by weight rubber (phr):

(A) (100 phr) of at least one elastomer, preferably at least one conjugated diene-based elastomer, (B) about 1 to about 10 phr of zinc soap comprised of:

(1) zinc rosinate (as an in situ formed product of zinc oxide and rosin acid within the rubber composition) to the exclusion of zinc stearate (for the zinc soap to thereby consist essentially of the zinc rosinate), or (2) a combination of zinc soaps comprised of:

(a) about 70 to about 95 weight percent of zinc rosinate (as an in situ formed product of zinc oxide and rosin acid within the rubber composition), (b) about 5 to about 30 weight percent of zinc stearate (as an in situ formed product of zinc oxide and stearic acid within the rubber composition), or (3) a combination of zinc soaps comprised of zinc rosinate and zinc stearate in a weight ratio of from about 2/1 to about 20/1 of zinc rosinate to zinc stearate;

wherein said zinc rosinate and said zinc stearate are the product of zinc oxide and rosin acid and stearic acid, respectively, formed in situ within the said rubber composition.

In practice, said rosin acids include gum rosin acid, wood rosin acid and tall oil rosin acid, and hydrogenated and disproportionated forms thereof, which are well known to those skilled in such art. For example, see "Rosin and Rosin Derivatives", found in the *Encyclopedia of Chemical Technology*, Second Edition, 1968, Pages 475 through 508.

In practice, said tire tread contains said zinc rosinate based zinc soap within its rubber composition and on its running surface, particularly when traveling over a wet substrate.

Accordingly, a significant aspect of the invention is the replacement of a major portion, or preferably total elimination, of stearic acid with rosin acid when used in a zinc oxide-containing sulfur curable diene-based elastomer containing rubber composition, particularly a tire tread rubber composition.

This aspect is considered herein as being significant in a sense of providing a tread rubber composition with zinc rosinate as the primary and preferably only zinc-based soap.

In practice, various elastomers, including conjugated diene-based elastomers, may be used for the tread rubber composition.

Representative of such elastomers are polymers comprised of at least one of isoprene and 1,3-butadiene and copolymers of styrene and at least one of isoprene and 1,3-butadiene.

Representative examples of such elastomers are, for example, comprised of cis 1,4-polyisoprene rubber, cis 1,4-polybutadiene rubber, styrene/butadiene copolymer rubber, styrene/isoprene/butadiene terpolymer rubber and isoprene/butadiene rubber.

The tire tread rubber composition may also contain minor amounts (e.g. up to about 25 phr) of saturated elastomers such as, for example, those comprised of EPDM (ethylene/propylene/non-conjugated diene terpolymer rubber), butyl rubber, halobutyl rubber and brominated copolymers of paramethylstyrene and isobutylene and their mixtures.

In one aspect, said tire tread rubber composition may contain from about 30 to about 120, alternately from about 30 to about 100, phr of particulate reinforcing fillers comprised of:

(A) carbon black, or (B) carbon black and up to about 100 phr of amorphous synthetic silica, preferably precipitated silica, or (C) from about 10 to about 100 phr of rubber reinforcing carbon black and from about 10 to about 100 phr of amorphous synthetic silica, preferably, precipitated silica.

The silica (e.g. precipitated silica) may optionally, and if desired, be used in conjunction with a silica coupler to couple the silica to the elastomer(s), to thus enhance its effect as reinforcement for the elastomer composition. Where said silica is used in the tread rubber composition, such silica couplers for such purpose are well known and typically have a moiety reactive with hydroxyl groups (e.g. silanol groups) contained on the silica and another moiety interactive with the elastomer(s), namely the said conjugated diene-based elastomers, to create the silica-to-rubber coupling effect.

In practice, a silica coupler ("coupling agent") may be, for example, (A) a bis-(3-triakloxysilylalkyl)polysulfide such as, for example, a bis-(3-triethoxysilylpropyl)polysulfide, having an average of from 2 to about 4 and more preferably an average of from 2 to about 2.6 or from about 3.4 to about 4, connecting sulfur atoms in its polysulfidic bridge, or (B) a bis-(3-triethoxysilylpropyl)polysulfide having an average of from about 2 to about 2.6 connecting sulfur atoms in its polysulfidic bridge or a bis-(3-triethoxysilylpropyl) polysulfide having an average of from about 3.4 to about 4 connecting sulfur atoms in its polysulfidic bridge, wherein said polysulfide having an average of from 2 to about 2.6 connecting sulfur atoms in its polysulfidic bridge (to the exclusion of such polysulfide having an average of from 3 to 4 connecting sulfur atoms in its polysulfidic bridge) is blended with said rubber composition in the absence of sulfur and sulfur vulcanization accelerator and wherein said polysulfide having an average of from about 3.4 to about 4 connecting sulfur atoms in its polysulfidic bridge is thereafter blended with said rubber composition in the presence of sulfur and at least one sulfur vulcanization accelerator, or (C) an organoalkoxymercaptosilane composition of the general Formula (I) represented as:

$$(X)_n(R_7O)_{3-n}-Si-R_8-SH \qquad (I)$$

wherein X is a radical selected from a halogen, namely chlorine or bromine and preferably a chlorine radical, and from alkyl radicals having from one to 16, preferably from one through 4, carbon atoms, preferably selected from methyl, ethyl, propyl (e.g. n-propyl) and butyl (e.g. n-butyl) radicals; wherein $R_7$ is an alkyl radical having from 1 through 18, alternately 1 through 4, carbon atoms preferably selected from methyl and ethyl radicals and more preferably an ethyl radical; wherein $R_8$ is an alkylene radical having from one to 16, preferably from one through 4, carbon atoms, preferably a propylene radical; and n is an average value of from zero through 3, preferably zero, and wherein, in such cases where n is zero or 1, $R_7$ may be the same or different for each ($R_7$O) moiety in the composition, and (D) said organoalkoxyomercaptosilane of the general Formula (I) capped with a moiety which uncaps the organoalkoxymercaptosilane upon heating to an elevated temperature.

Representative examples of various organoalkoxymercaptosilanes are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane.

Such organoalkoxymercaptosilanes may be capped with various moieties as discussed above.

A representative example of a capped organoalkoxymercaptosilane coupling agent useful for this invention is a liquid 3-octanoylthio-1-propyltriethoxysilane as NXT™ Silane from the GE Silicones Company.

The coupling agent may, for example, be added directly to the elastomer mixture or may be added as a composite of precipitated silica and such coupling agent formed by treating a precipitated silica therewith or by treating a colloidal silica therewith and precipitating the resulting composite.

For example, said silica (e.g. precipitated silica), or at least a portion of said silica, may be pre-treated prior to addition to said elastomer(s):

(A) with an alkylsilane of the general Formula (II), or (B) with said bis(3-triethoxysilylpropyl)polysulfide having an average of from about 2 to about 4 connecting sulfur atoms in its polysulfidic bridge, or (C) with said organomercaptosilane of the general Formula (I), or (D) with a combination of said alkylsilane of general Formula (I) and said bis(3-triethoxysilylpropyl)polysulfide having an average of from about 2 to about 4 connecting sulfur atoms in its polysulfidic bridge, or (E) with a combination of said alkylsilane of general Formula (II) and said organomercaptosilane of general Formula (I);

wherein said alkylsilane of the general Formula (I) is represented as:

$$X_n-Si-R_{6(4-n)} \qquad (II)$$

wherein $R_6$ is an alkyl radical having from 1 to 18 carbon atoms, preferably from 1 through 4 carbon atoms; n is a value of from 1 through 3; X is a radical selected from the group consisting of halogens, preferably chlorine, and alkoxy groups selected from methoxy and ethoxy groups, preferably an ethoxy group.

A significant consideration for said pre-treatment of said silica is to reduce, or eliminate, evolution of alcohol in situ within the rubber composition during the mixing of the silica with said elastomer such as may be caused, for example, by reaction such coupling agent contained within the elastomer composition with hydroxyl groups (e.g. silanol groups) contained on the surface of the silica.

It is readily understood by those having skill in the art that the rubber compositions would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, waxes, antioxidants and antiozonants, peptizing agents and reinforcing materials such as, for example, carbon black. As known to those skilled in the art, depending on the intended use of the sulfur vulcanizable and sulfur-vulcanized material (rubbers), the additives mentioned above are selected and commonly used in conventional amounts.

Typical amounts of tackifier resins, if used, may comprise about 0.5 to about 10 phr, usually about 1 to about 5 phr. Typical amounts of processing aids may comprise 1 to 20 phr. Such processing aids can include, for example, aromatic, napthenic, and/or paraffinic processing oils. Silica and carbon black reinforcement have has been hereinbefore discussed. Typical amounts of antioxidants, where used, may comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants, where used, may comprise about 1 to about 5 phr. Typical amounts of waxes, if used, may comprise about 1 to about 5 phr. Often microcrystalline waxes are used. Typical amounts of peptizers, if used, may comprise about 0.1 to about 1 phr. Typical peptizers may be, for example, pentachlorothiophenol and dibenzamidodiphenyl disulfide. The presence and relative amounts of the above additives are considered to be not an aspect of the present invention, unless otherwise noted herein, which is more primarily directed to the utilization of zinc rosinate in place of zinc stearate as a product of zinc oxide and rosin acid formed in situ within the tread rubber composition and on its running surface.

The vulcanization is conducted in the presence of a sulfur-vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, with a range of from about 0.5 to about 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators in which the primary accelerator is generally used in the larger amount (0.5 to 2 phr), and a secondary accelerator which is generally used in smaller amounts (0.05 to 0.50 phr) in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the specified blend of polymers for tire treads.

Sometimes a combination of antioxidants, antiozonants and waxes may be collectively referred to as antidegradants.

The tire can be built, shaped, molded and cured by various methods which will be readily apparent to those having skill in such art.

The invention may be better understood by reference to the following example in which the parts and percentages are by weight unless otherwise indicated.

EXAMPLE I

Experiments were conducted to evaluate the feasibility of introducing rosin acid in place of stearic acid in a rubber composition in combination with zinc oxide to enable an in situ formation of zinc rosinate within the rubber composition.

Rubber composition Samples A through F were prepared, with Sample A being a Control Sample formulated with a combination of zinc oxide and an addition of one phr of stearic acid to form zinc stearate in situ within the rubber composition. Samples B and C were formulated with an addition of 3 and 5 phr of stearic acid, respectively so that, in a sense, they are also Control Samples.

Experimental Samples D, E and F were formulated with rosin acid (instead of adding the stearic acid) in amounts of 1, 3 and 5 phr of rosin acid, respectively to form zinc rosinate in situ within the rubber compositions.

The rubber composition samples were prepared by mixing the elastomers(s) together with reinforcing fillers and other rubber compounding ingredients in a first non-productive mixing stage (NP) in an internal rubber mixer for about 4 minutes to a temperature of about 160° C. The mixture is then further sequentially mixed in a second non-productive mixing stage (NP) in an internal rubber mixer (no additional ingredients added) to a temperature for about 3 minutes to a temperature of about 160° C. The resulting mixture is then mixed in a productive mixing stage (P) in an internal rubber mixer with curatives for about 2 minutes to a temperature of about 110° C. The rubber composition is cooled to below 40° C. between each of the non-productive mixing steps and between the second non-productive mixing step and the productive mixing step.

The basic formulation for the rubber samples is presented in the following Table 1.

TABLE 1

|  | Parts |
|---|---|
| First Non-Productive Mixing Step (NP1) |  |
| Natural rubber[1] | 100 |
| Carbon black[2] | 50 |
| Rubber processing oil | 5 |
| Zinc oxide | 5 |
| Antioxidant[3] | 2 |
| Fatty acid (stearic acid), excluding rosin acid[4] | 0, 1, 3, 5 |
| Rosin acid[5] | 0, 1, 3, 5 |
| Productive Mixing Step (P) |  |
| Sulfur | 1.4 |
| Accelerator(s)[6] | 1 |

[1]TSR 20 natural rubber, which would ordinarily contain an average of from about 0.03 to about 1 weight percent naturally occurring (not free addition) $C_{18}$ fatty acids which may include naturally occurring stearic acid
[2]N299 rubber reinforcing carbon black, an ASTM designation
[3]Quinoline type
[4]Blend comprised of stearic, palmitic and oleic acids containing at least 90 weight percent stearic acid.
[5]As gum rosin acid from the Eastman Chemical Company
[6]Sulfenamide and guanidine types The following Table 2 illustrates cure behavior and various physical properties of rubber compositions based upon the basic recipe of Table 1 and reported herein as a Control Sample A and Samples B through F, including Samples D, E and F formulated with rosin acid and zinc oxide.

TABLE 2

|  | Rubber Samples | | | | | |
|---|---|---|---|---|---|---|
|  | Control A | B | C | D | E | F |
| Fatty acid (stearic acid), excl rosin acid, (phr) | 1 | 3 | 5 | 0 | 0 | 0 |
| Rosin acid (phr) | 0 | 0 | 0 | 1 | 3 | 5 |
| Rheometer, 150° C., MPa |  |  |  |  |  |  |
| Maximum torque | 17.5 | 17.4 | 16.9 | 16.8 | 15.4 | 14.5 |
| Minimum torque | 3.1 | 3 | 2.8 | 3.4 | 3.1 | 3.2 |

TABLE 2-continued

| | Rubber Samples | | | | | |
|---|---|---|---|---|---|---|
| | Control A | B | C | D | E | F |
| Delta torque | 14.4 | 14.4 | 14.1 | 13.4 | 13.3 | 11.3 |
| T90 (minutes) | 11.5 | 13.6 | 15 | 13 | 15.1 | 17.1 |
| Stress-strain, ATS[1], 14 min, 160° C. | | | | | | |
| Tensile strength (MPa) | 24.4 | 24.7 | 22.9 | 22 | 21.8 | 22.2 |
| Elongation at break (%) | 469 | 451 | 418 | 468 | 490 | 524 |
| 300% modulus, ring (MPa) | 14 | 15.4 | 16 | 12.4 | 11.5 | 10.2 |
| Rebound | | | | | | |
| 23° C. | 51 | 50 | 49 | 49 | 47 | 46 |
| 100° C. | 63 | 64 | 63 | 60 | 58 | 57 |
| Shore A Hardness | | | | | | |
| 23° C. | 63 | 67 | 68 | 63 | 64 | 63 |
| 100° C. | 59 | 61 | 60 | 59 | 58 | 57 |
| Coefficient of Friction[2] | | | | | | |
| Average coefficient, on a dry substrate | 3.28 | 3.55 | 3.08 | 3.48 | 3.26 | 3.15 |
| Average coefficient, on a wet substrate | 0.98 | 1.07 | 1.05 | 1.2 | 1.45 | 2.11 |
| Pendulum Skid Resistance[3] | | | | | | |
| On wet concrete substrate | 45 | 44 | 45 | 49 | 49 | 49 |
| On wet asphalt substrate | 56 | 55 | 57 | 56 | 57 | 60 |

[1]Automated Testing System instrument of the Instron Corporation
[2]ASTM D-1894. A coefficient of friction (COF) value for a rubber sample may be measured, for example, on a Model SP-2000 Slip/Peel tester from IMASS Inc at 6 inches (about 15.2 cm) per minute using a 200 g sled against a substrate surface such as, for example, a polished aluminum surface
[3]A laboratory test to measure resistance of a rubber sample to movement over a substrate surface and is considered herein as being less sensitive to variation in values of resistance to movement over a substrate surface than the above coefficient of friction test.

From Table 2 it can be seen that the coefficient of friction values for Samples A through F (which contained the zinc stearate or the zinc rosinate) are similar for dry substrate conditions. However the coefficient of friction values for Samples D, E and F (which contained the zinc rosinate instead of the zinc stearate—formed in situ within the rubber composition as a product of rosin acid and zinc oxide) were dramatically improved for wet substrate conditions as compared to Samples A, B and D which contained the zinc stearate without the zinc rosinate.

From Table 2 it can further be seen that the skid resistant values confirmed the above coefficient values as being significantly improved for Samples D, E and F which contained the zinc rosinate instead of the zinc stearate of Samples A, B and D.

Accordingly, it is concluded that a tire with a tread of rubber composition containing a zinc soap in a form of zinc rosinate instead of zinc stearate may be prepared to promote an increase in coefficient of friction of the tread's running surface over a wet substrate, such as a wet road (e.g. a concrete or asphalt surfaced road).

A tire is prepared with a tread containing zinc rosinate within its rubber composition and on its running surface similar to the rubber composition of Rubber Sample F—where the zinc rosinate is the product of zinc oxide and rosin acid formed in situ within its rubber composition—and where the tread rubber composition does not contain zinc stearate from stearic acid being added to the zinc oxide containing tread rubber composition.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a tread composed of a rubber composition which contains zinc rosinate within said rubber composition and on the tread's running surface comprised of, based upon parts by weight per 100 parts by weight rubber (phr):
   (A) (100 phr) of at least one conjugated diene-based elastomer,
   (B) about 1 to about 10 phr of a combination of zinc soap consisting of zinc rosinate and additional zinc soap comprised of a combination of stearic acid, palmitic acid and oleic acid, wherein the zinc soap has a weight ratio of from 2/1 to 20/1 of zinc rosinate to said additional zinc soap.

2. The tire of claim 1 wherein said tire tread is comprised of conjugated diene-based elastomers comprised of at least one polymer of isoprene and 1,3-butadiene and copolymer of styrene and at least one of isoprene and 1,3-butadiene.

3. The tire of claim 1 wherein said rubber contains from about 30 to about 120 phr of particulate rubber reinforcing filler comprised of:
   (A) carbon black, or
   (B) carbon black and up to about 100 phr of precipitated silica, or
   (C) from 10 to about 110 phr of rubber reinforcing carbon black and from about 10 to about 110 phr of precipitated silica.

4. The tire of claim 3 wherein said particulate reinforcing filler contains said precipitated silica and further contains a silica coupler having a moiety reactive with hydroxyl groups on said precipitated silica and another moiety interactive with said conjugated diene-based elastomers.

5. The tire of claim 1 wherein said rosin acid is comprised of gum rosin acid.

6. The tire of claim 1 wherein said rosin acid is comprised of wood rosin acid.

7. The tire of claim 1 wherein said rosin acid is comprised of tall oil rosin acid.

8. The tire of claim 1 wherein said rosin acid is comprised of at least one of hydrogenated gum rosin acid, wood rosin acid and tall oil rosin acid and their mixtures.

9. The tire of claim 1 wherein said rosin acid is comprised of at least one of disproportionated gum rosin acid, wood rosin acid and tall oil rosin acid and their mixtures.

* * * * *